United States Patent
Alibhai et al.

(10) Patent No.: US 12,182,608 B2
(45) Date of Patent: Dec. 31, 2024

(54) SYSTEM AND METHODS FOR IMPLEMENTING A COMPUTER PROCESS AUTOMATION TOOL

(71) Applicant: PwC Product Sales LLC, New York, NY (US)

(72) Inventors: Shabbir Hussamuddin Alibhai, Houston, TX (US); Ryan Paul Beechey, Broomfield, CO (US); Joseph Michael Engel, Stuyvesant, NY (US); Christopher Ryan Tucci, Trenton, NJ (US); Thomas Joseph Foth, Melrose, MA (US); Antoinette L. Young, Pembroke Pines, FL (US)

(73) Assignee: PwC Product Sales LLC, New York, NY (US)

( * ) Notice: Subject to any disclaimer, the term of this patent is extended or adjusted under 35 U.S.C. 154(b) by 575 days.

(21) Appl. No.: 17/395,044

(22) Filed: Aug. 5, 2021

(65) Prior Publication Data
US 2022/0043668 A1 Feb. 10, 2022

Related U.S. Application Data

(60) Provisional application No. 63/062,224, filed on Aug. 6, 2020.

(51) Int. Cl.
*G06F 9/46* (2006.01)
(52) U.S. Cl.
CPC ..................................... *G06F 9/46* (2013.01)
(58) Field of Classification Search
None
See application file for complete search history.

(56) References Cited

U.S. PATENT DOCUMENTS

| | | | | |
|---|---|---|---|---|
| 11,531,763 | B1 * | 12/2022 | Gupta | G06F 21/577 |
| 2018/0113780 | A1 * | 4/2018 | Kim | G06F 8/30 |
| 2018/0181446 | A1 * | 6/2018 | Bequet | G06F 9/5066 |

(Continued)

OTHER PUBLICATIONS

Tsakalidis, George, Kostas Vergidis, Georgia Kougka, and Anastasios Gounaris. "Eligibility of BPMN models for business process redesign." Information 10, No. 7 (2019): 225. (Year: 2019).*

(Continued)

*Primary Examiner* — Frank D Mills
(74) *Attorney, Agent, or Firm* — Morrison & Foerster LLP

(57) ABSTRACT

Systems and methods for implementing an automation platform that is configured to analyze computing activities from a plurality of users so as to identify potential automation processes is provided. In one or more examples, a plurality of data collection agents are deployed across a plurality of computing devices and can be configured to collect and record activities performed on the computing device by one or more users of the computing devices. In one or more examples, each agent deployed on a computing device can be configured to transmit the collected data to a central server that can store the collected data in memory. The central server can be configured to collect the data from each agent and can be configured to apply one or more data science algorithms that can be configured to cluster various activities collected by the agents into groups for potential automation.

33 Claims, 9 Drawing Sheets

(56) References Cited

U.S. PATENT DOCUMENTS

2020/0092178 A1\* 3/2020 Nelson ............. G06Q 10/06316
2020/0206920 A1\* 7/2020 Ma ...................... G06F 11/3438
2022/0291966 A1\* 9/2022 Masood ................ G06F 3/0486
2022/0327351 A1\* 10/2022 Barello .................. G06N 3/008

OTHER PUBLICATIONS

FortressIQ. (2020). "Cognitive Process Intelligence," 4 pages.
Protalinkski, E. (Dec. 9, 2020) "Microsoft debuts Power Automate process advisor and new RPA features," located at https://venturebeat.com/2020/12/09/microsoft-power-automate-process-advisor-rpa-features/. (9 pages).
Microsoft Power Automate. (Nov. 17, 2020). "Optimize efficiency with process mining in Microsoft Power Automate," located at https://youtu.be/r4g_OLHPloc. (3 pages).

\* cited by examiner

| Event Attribute | Property Value |
|---|---|
| Activity ID | 1001 |
| Activity Time | 10/3/2019 7:33 |
| Action Type | Left Click |
| Click Coordinates | 505,777 |
| Application Name | iexplore |
| Window Title | Google - Internet Explorer |
| Object Type | Button |
| Object Name | Google Search |
| | |

FIG. 3

SYSTEM AND METHODS FOR IMPLEMENTING A COMPUTER PROCESS AUTOMATION TOOL

REFERENCE TO RELATED APPLICATIONS

This application claims the benefit of U.S. Provisional Patent Application No. 63/062,224, filed Aug. 6, 2020, the entire contents of which are incorporated herein by reference.

FIELD OF THE DISCLOSURE

This disclosure relates to process automation and specifically to systems and methods for determining process automation opportunities and implementing tools to automate processes.

BACKGROUND OF THE DISCLOSURE

Industry has long looked to automation as a way to reduce cost while in many cases increasing throughput. What was once done through human manual labor can now be done by machines. Over the years, the manufacturing sector has automated many processes used to build products, thereby decreasing the costs to make the products while at the same time increasing the amount of product that is able to be produces over a given period of time.

While physical automation (i.e., replacing physical labor with machine labor) has been widespread and incorporated into a wide-variety of industries, the same cannot be said of processes that humans perform on computers. Often times, employees of a particular business or enterprise are required to engage in repetitive processes on computers. For instance, generating reports, entering data, and various financial tasks are performed on computers by businesses on a routine basis. These repetitive processes could benefit from automation, however determining what process can be readily automated can be a challenge.

During conventional automation projects, a process architect (i.e., an individual tasked with determining automation opportunities) can sit with multiple subject matter experts to map processes. Once the processes are mapped, teams can review the processes to determine if there is potential to automate, by looking for repetitive sequences and calculating the return on investment of automation (i.e., how much time and money could be saved through automation). This methodology is the de facto means by which automation opportunities are evaluated. However, the methodology has various short comings. For instance, the methodology can be prone to subjective analysis since the process review is usually biased by the interviewer and interviewee's view of the process. Further, the analysis may not consider deviations of the standard process steps that are important to understanding and creating a viable automation. These shortcomings often contribute to pursuing automations that are either not automatable, lack sufficient return on investment, or produce automations that do not cover all process steps.

What is needed is a system that can accurately record the activities performed by employees at a given business, and accurately determine whether or not an opportunity to automate exists based on the recorded activities. The system should also be configured to reduce the time and effort required to automate processes in addition to identifying automation opportunities that can produce a significant return on investment.

SUMMARY OF THE DISCLOSURE

Accordingly, systems and methods for implementing an automation platform that is configured to analyze computing activities from a plurality of users so as to identify potential automation processes is provided.

In one or more examples, a plurality of data collection agents are deployed across a plurality of computing devices and can be configured to collect and record activities performed on the computing device by one or more users of the computing devices. Each agent can be configured to capture various activities such as key strokes, mouse clicks and other types of user entry. In one or more example, the agents can be configured to prevent the collection of types of data that may be personal or private and that the user of the computing device may not want collected by an agent.

In one or more examples, each agent deployed on a computing device can be configured to transmit the collected data to a central server that can store the collected data in memory. The central server can be configured to collect the data from each agent, clean the data to remove extraneous data, modify the data for readability, and in one or more examples format the data for processing.

Once the data has been cleansed and formatted, in one or more examples, the data can be processed so that it can be visualized by a user or computing device. In one or more examples, the visualization created by the system can illustrate how many clusters of automatable activity may exist in the processes recorded by the agents, and can also provide insights into deviations from standard processes, difficulty of automation implementation, and bottlenecks in the processes conducted by users on their computing devices.

In one or more examples, after visualizing the data, the system can then apply one or more data science algorithms that can be configured to cluster various activities collected by the agents into groups for potential automation. In one or more examples, in order to organize the data into clusters, the system can construct a model of the data by first organizing the data into a graph, determine any temporal similarities between values, and apply one or more algorithms to find segmentation within the graph that can be indicative of processes that could be potentially automated.

According to an aspect, a method for identifying computing processes to be automated includes: receiving data from one or more computing devices, wherein the received data includes information about one or more activities conducted by one or more users of the one or more computing devices; transforming the information about the one or more activities conducted by the one or more users of the one or more computing devices into one or more attributes, wherein the one or more attributes define information about one or more processes conducted by the one or more users; generating a visualization of the one or more attributes, wherein the visualization is configured to provide a visualization of the one or more processes conducted by the one or more users; and identifying one or more process clusters based on the one or more attributes, wherein identifying the one or more process clusters based on the one or more attributes includes applying a segmentation algorithm to the one or more attributes.

Optionally, the method further comprises: converting an identified process cluster of the one or more process clusters into a process flow diagram, wherein the process flow diagram includes one or more steps to performing a process; and generating software code that is configured to perform the process.

Optionally, the data received from the one or more computing devices is generated by: recording one or more user inputs at a computing device; comparing the one or more user inputs to one or more inputs listed in a definition file; and if the one or more user inputs matches one or more of the inputs listed in the definition file: recording one or more parameters associated with the one or more user inputs.

Optionally, the definition file includes a list of possible inputs by the one or more users that is approved to be recorded.

Optionally, transforming the information about the one or more activities conducted by the one or more users of the one or more computing devices into one or more attributes includes generating a plurality of activity IDs and a plurality of case IDs wherein the plurality of activity IDs and case IDs is based on the information about the one or more activities received from the one or more computing devices.

Optionally, the one or more activity IDs correspond to one or more types of activity being performed on the one or more computing devices.

Optionally, a case ID of the plurality of case IDs corresponds to a common process being performed by the one or more types of activities corresponding to one or more of the activity IDs of the plurality of activity IDs.

Optionally, the visualization of the one or more attributes includes a plurality of nodes, each node of the plurality of nodes corresponding a combination of an activity ID and a case ID.

Optionally, the visualization of the one or more attributes includes a plurality of edges, wherein an edge of the plurality of edges connects a first node and a second node of the plurality of nodes in the visualization, wherein the edge originates from the first node and terminates at the second node, and wherein the edge indicates that the one or more users first performed an activity associated with the first node and then performed an activity associated with the second node.

Optionally, identifying one or more process clusters based on the one or more attributes includes performing a data sequence segmentation analysis on the one or more attributes.

Optionally, the data sequence segmentation analysis associates one or more cluster IDs to the information about one or more activities conducted by the one or more users of the one or more computing devices, wherein each cluster ID is associated with a process cluster of the one or more process clusters.

Optionally, each cluster ID of the one or more cluster IDs is associated with a subset of activities of the one or more activities conducted by the one or more users of the one or more computing devices.

According to an aspect, a system for identifying computing processes to be automated includes: a memory; one or more processors; and one or more programs, wherein the one or more programs are stored in the memory and configured to be executed by the one or more processors, the one or more programs when executed by the one or more processors cause the processor to: receive data from one or more computing devices, wherein the received data includes information about one or more activities conducted by one or more users of the one or more computing devices; transform the information about the one or more activities conducted by the one or more users of the one or more computing devices into one or more attributes, wherein the one or more attributes define information about one or more processes conducted by the one or more users; generate a visualization of the one or more attributes, wherein the visualization is configured to provide a visualization of the one or more processes conducted by the one or more users; and identify one or more process clusters based on the one or more attributes, wherein identifying the one or more process clusters based on the one or more attributes includes applying a segmentation algorithm to the one or more attributes.

Optionally, the one or more processors are further caused to: convert an identified process cluster of the one or more process clusters into a process flow diagram, wherein the process flow diagram includes one or more steps to performing a process; and generate software code that is configured to perform the process.

Optionally, the data received from the one or more computing devices is generated by: recording one or more user inputs at a computing device; comparing the one or more user inputs to one or more inputs listed in a definition file; and if the one or more user inputs matches one or more of the inputs listed in the definition file: recording one or more parameters associated with the one or more user inputs.

Optionally, the definition file includes a list of possible inputs by the one or more users that is approved to be recorded.

Optionally, transforming the information about the one or more activities conducted by the one or more users of the one or more computing devices into one or more attributes includes generating a plurality of activity IDs and a plurality of case IDs wherein the plurality of activity IDs and case IDs is based on the information about the one or more activities received from the one or more computing devices.

Optionally, the one or more activity IDs correspond to one or more types of activity being performed on the one or more computing devices.

Optionally, a case ID of the plurality of case IDs corresponds to a common process being performed by the one or more types of activities corresponding to one or more of the activity IDs of the plurality of activity IDs.

Optionally, the visualization of the one or more attributes includes a plurality of nodes, each node of the plurality of nodes corresponding a combination of an activity ID and a case ID.

Optionally, the visualization of the one or more attributes includes a plurality of edges, wherein an edge of the plurality of edges connects a first node and a second node of the plurality of nodes in the visualization, wherein the edge originates from the first node and terminates at the second node, and wherein the edge indicates that the one or more users first performed an activity associated with the first node and then performed an activity associated with the second node.

Optionally, identifying one or more process clusters based on the one or more attributes includes performing a data sequence segmentation analysis on the one or more attributes.

Optionally, the data sequence segmentation analysis associates one or more cluster IDs to the information about one or more activities conducted by the one or more users of the one or more computing devices, wherein each cluster ID is associated with a process cluster of the one or more process clusters.

Optionally, each cluster ID of the one or more cluster IDs is associated with a subset of activities of the one or more activities conducted by the one or more users of the one or more computing devices.

According to an aspect, a non-transitory computer readable storage medium storing one or more programs is provided, the one or more programs comprising instructions, which, when executed by an electronic device with a display and a user input interface, cause the device to: receive data from one or more computing devices, wherein the received data includes information about one or more activities conducted by one or more users of the one or more computing devices; transform the information about the one or more activities conducted by the one or more users of the one or more computing devices into one or more attributes, wherein the one or more attributes define information about one or more processes conducted by the one or more users; generate a visualization of the one or more attributes, wherein the visualization is configured to provide a visualization of the one or more processes conducted by the one or more users; and identify one or more process clusters based on the one or more attributes, wherein identifying the one or more process clusters based on the one or more attributes includes applying a segmentation algorithm to the one or more attributes.

Optionally, the device is further caused to: convert an identified process cluster of the one or more process clusters into a process flow diagram, wherein the process flow diagram includes one or more steps to performing a process; and generate software code that is configured to perform the process.

Optionally, the data received from the one or more computing devices is generated by: recording one or more user inputs at a computing device; comparing the one or more user inputs to one or more inputs listed in a definition file; and if the one or more user inputs matches one or more of the inputs listed in the definition file: recording one or more parameters associated with the one or more user inputs.

Optionally, the definition file includes a list of possible inputs by the one or more users that is approved to be recorded.

Optionally, transforming the information about the one or more activities conducted by the one or more users of the one or more computing devices into one or more attributes includes generating a plurality of activity IDs and a plurality of case IDs wherein the plurality of activity IDs and case IDs is based on the information about the one or more activities received from the one or more computing devices.

Optionally, the one or more activity IDs correspond to one or more types of activity being performed on the one or more computing devices.

Optionally, a case ID of the plurality of case IDs corresponds to a common process being performed by the one or more types of activities corresponding to one or more of the activity IDs of the plurality of activity IDs.

Optionally, the visualization of the one or more attributes includes a plurality of nodes, each node of the plurality of nodes corresponding a combination of an activity ID and a case ID.

Optionally, the visualization of the one or more attributes includes a plurality of edges, wherein an edge of the plurality of edges connects a first node and a second node of the plurality of nodes in the visualization, wherein the edge originates from the first node and terminates at the second node, and wherein the edge indicates that the one or more users first performed an activity associated with the first node and then performed an activity associated with the second node.

Optionally, identifying one or more process clusters based on the one or more attributes includes performing a data sequence segmentation analysis on the one or more attributes.

Optionally, the data sequence segmentation analysis associates one or more cluster IDs to the information about one or more activities conducted by the one or more users of the one or more computing devices, wherein each cluster ID is associated with a process cluster of the one or more process clusters.

Optionally, each cluster ID of the one or more cluster IDs is associated with a subset of activities of the one or more activities conducted by the one or more users of the one or more computing devices.

BRIEF DESCRIPTION OF THE DRAWINGS

FIG. 3 illustrates exemplary user data capture information according to examples of the disclosure.

DETAILED DESCRIPTION

Figure 1:
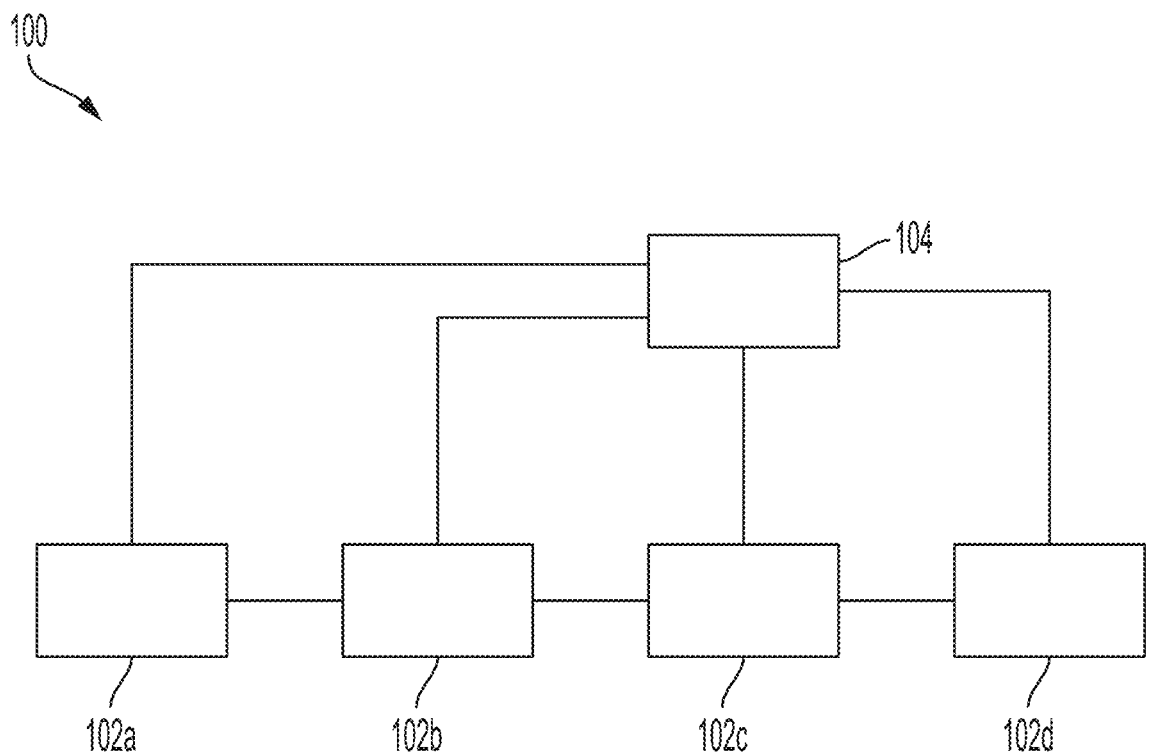
FIG. 1 illustrates an exemplary enterprise computing environment according to examples of the disclosure.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Described herein are systems and methods for implementing a process mining and automation platform. In one or more examples, the platform can deploy a plurality of agents across a plurality of computers belonging to a business enterprise, wherein each agent is configured to record and collect data regarding activities of the user of the computing device. The data can then be used to determine one or more process automation opportunities. In one or more examples, once the process automation opportunities are identified, the platform can be further configured to generate one or computer programs that are configured to automate the process identified.

Automation has long been used in the industrial and manufacturing sectors to reduce the amount of human intervention required to carry out a process or procedure. As an example, the auto industry has used automation to more efficiently build automobiles by replacing human labor with machines that are configured to perform the same processes and procedures during the manufacture of an automobile that would have otherwise been performed by a human. The benefits of automation is clearly evident. By automating process and thus removing the reliance on human actors to perform processes, often times the execution of the processes becomes faster, more efficient, and it can the process can be performed with increased accuracy.

Many business and organizations, however, use computers to carry out the daily processes necessary for the day-to-day operation of the business. Similar to manufacturing processes, many processes performed on computers can be repetitive, and thus like manufacturing processes, computer processes could also benefit from process automation insofar as doing so could reduce the amount of human intervention needed to carry out a process. However identifying computer processes that could be automated can be a difficult task. First, many repetitive computing processes are performed on a plurality of separate computing devices, and thus processes which are being repeatedly performed across the computing network of a business or enterprise may difficult to ascertain. Second, even if a single process can view the processes occurring over multiple computing devices, identifying clusters of computing activity that could benefit from process automation can be difficult.

FIG. 1 illustrates an exemplary enterprise computing environment according to examples of the disclosure. In the example of FIG. 1, computing environment 100 can represent an enterprise or business computing environment. The computing environment 100 can include a plurality of end-user computing devices 102a-d that can represent the computing devices employed by the employees of a business. Each computing device 102a-102d can be interconnected to one another via a wired or wireless network connection so that they are able to transmit data between one another.

In one or more examples, each computing device 102a-d can also be connected to a central server 104 that can also receive data from each of the computing devices. The central server 104 arbitrate network traffic between each of the computing devices 102a-d and can also be configured to provide network connections between each of the computing devices and external computing devices so as to establish an internet and/or intranet connection to each of the computing devices. In one or more examples, the central server 104 can include a memory that can be accessed and shared by each of the computing devices 102a-d.

As described above, each of computing devices 102a-d can be used by an employee of a business or enterprise to conduct the day-to-day operations of the company that employs the computing system 100. During an average business day, each of computing devices 102a-d can be utilized to carry out the daily routines and processes that a company carries out. Such processes as data entry, report generation, data archiving, etc., can be carried out on a daily basis by employees utilizing computing devices 102a-d. In one or more examples, one or more processes carried out on computing devices 102a-d can be automated because the process is repeatedly carried out in substantially the same manner every day. If any one of the number of repeated processes could be "automated" (i.e., conducted with little to no human intervention) a business could save precious time and even money by not having to require an employee to manually carry out the same repeated processes over and over again day in and day out.

The first step of automating a process can be to first identify a process that is repeated over and over again so as to make the automation worth the effort. If a process is not repeated often or is repeated in an inconsistent manner, then automating the process might not lead to the time and cost reductions that would make the effort to automate the process worth it. In one or more examples, if the process is not performed in a consistent manner or the process has a great deal of variation, then automating such a process could lead to the opposite of the intended effect, and can require more human time and effort and engender additional cost than if the process were simply carried out by human employees.

Thus, the process of identifying a process that is repeated over and over and an in a consistent manner can be an important first step in ultimately automating any computer process. However, since processes can be carried out on individual computing devices 102a-d, in order to determine processes that are highly repeated and in a consistent manner, a "birds-eye" view of all of the computing devices in an enterprise may be necessary to determine whether or not a process is repeated consistently throughout the entire company. Simply looking at the processes performed on one of the computing devices 102a-d may not be sufficient to properly ascertain whether or not the process is repeated throughout a company or is performed in a consistent enough manner so as to make the automation of that process worthwhile.

Thus, in one or more examples, in order to identify processes that are worth automating, an enterprise or business may need to possess the ability to view the collective activity performed at each of its end-user computing devices so as to ascertain which process are consistently repeated. In one or more examples, an enterprise computing system may employ an activity monitor at each of its computing devices 102a-d to monitor and log employee activity at each computing device. The activity monitor can be deployed at each and every computing device 102a-d of a computing environment 100 and can be configured to detect keystrokes and mouse activity being performed at each computing device. The activity monitor, as described in further detail below can be used to only certain activities, and can also be configured to other data associated with the users keystrokes so as to provide a complete picture of the process which can lead to an enhanced ability to detect whether a process is a good candidate for automation.

Monitoring the keystrokes of every employee at the computing devices that they use can be invasive. Oftentimes employees may enter personal information into their computing device that they may not want recorded by their employer. Furthermore, employees may engage their computing devices to perform many tasks not related to their job functions, and thus the activity monitor may not want to capture that data. In one or more examples, the employee may be entering confidential business data that the enterprise/business would not want being recorded so as to maintain the confidentiality of the data.

Thus, in one or more examples, the activity monitor may be configured to only record certain types of activities, while excluding from the recording process, other types of data entry that the enterprise may not want to be recorded. In one or more examples, they activity monitors employed on each computing device 102a-d can be configured to transmit data to central server 104 such that the central server 104 can receive keystroke data from each and every computing device employed in the system 100, while also being configured to only collect certain data so as to maintain the privacy of the employees as well as the data they enter into the computing devices that may be unnecessary to determine if a process is worth automating.

Figure 2:
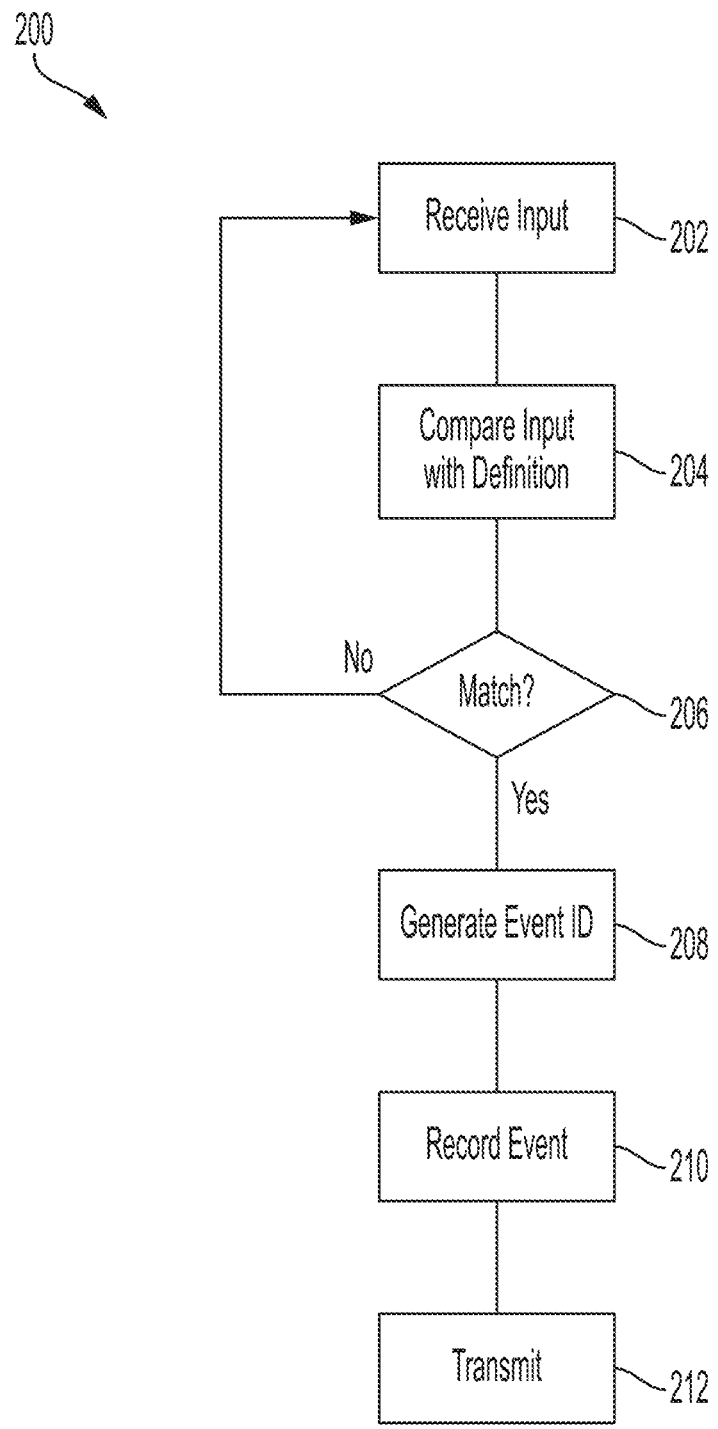
FIG. 2 illustrates an exemplary process for identifying process automations according to examples of the disclosure.

FIG. 2 illustrates an exemplary process for identifying process automations according to examples of the disclosure. The process 200 of FIG. 2 can represent the process used by an activity monitor as described above to capture data regarding a user's input to a computing device in a manner that maintains the user's data privacy, and then transmit the captured data to the central server 104 for further processing. In one or more examples of the disclosure, the process 200 can begin at step 202 wherein the activity monitor can receive an input from a user. In one or more examples, the input can represent a mouse-click, a keyboard input, or any other type of external input that a computer can receive from a user that causes the computing device to take some type of action.

In one or more examples, the activity monitor can be constantly running on a computing device such as computing devices 102a-d, and local copy of the activity monitor can be installed on each individual computing device 102a-d. In one or more examples, the activity monitor can be continuously running on a computing device and may not ever go to sleep due to lack of user activity.

Once a user's input is received at step 202, the process can move to step 204 wherein the received input can be compared against a predefined input definition file. As discussed above, one goal of the keystroke monitor can be to record user activity while maintaining data privacy of a user. Thus, in one or more examples, the activity monitor can be configured to only record user inputs that match predefined combinations of keystrokes and/or mouse inputs that have been previously deemed to be of interest. As an example certain keystroke combinations such as CTRL+C, CTRL+V, ALT+F, etc., may be found to be indicative of a user process that may be of interest. In one or more examples, the activity monitor, at step 204 can record user input and then compare the user input to the predefined input definition file to see if the user input matches with one of the plurality of input combinations that are predefined in the input definition file.

At step 206, if the input recorded at step 202 matches to one of the input combinations described above with respect to step 204, the process can move to step 208 (described in detail below). However, if the entered input does not match one of the combinations identified in the definition file, the process can revert back to step 202 to receive further input from a user, as the entered input is not one that will be recorded by the activity monitor. In this way, if a user enters personal information or other sensitive data, that data is not likely to match any of the input combinations found in the definition file and thus isn't recorded thereby maintaining the privacy of the data.

If there is a match at step 206, then as described above, in one or more examples the process 200 can move to step 208 wherein an event ID is generated that will be associated with the input by the user that matches to one or more combinations found in the definition file. The event ID (as explained in detail further below) can be used to identify a particular user's input at any given time, and can be used to determine processes that are often repeated such that it may benefit from automation.

Once an event ID is generated at step 208, the process 200 can move to step 210 wherein the event associated with the matching user input can be recorded. In one or more examples, the process of recording event can be illustrated by an example. For instance, if a user performs a mouse click (which matches to a definition in the definition file or to a definition defined in the software code used to the implement the activity monitor) the activity monitor can check to see if the mouse click is a left or a right click. In one or more examples, if the mouse click is a left click, then the user may be clicking on something on the screen and the activity monitor can record the coordinates on the screen where the mouse was clicked. Simultaneously, the activity monitor can take a screenshot at the moment the mouse clicked occurred in addition to recording the coordinates of the mouse click. In one or more examples, the activity monitor can check to see if the mouse click is some sort of control that may be of interest. For instance, if the user opens a web browser and accesses a search engine by typing a known web address the activity monitor can capture that activity at step 210. Because the mouse click was performed at the input text box of the browser, the activity monitor can know that user is using a web browser and can record that at step 210. In one or more examples, at step 210, the activity monitor based on the identified context in which the mouse click occurred can associate the label of the input text field search within the web browser with the mouse click.

In one or more examples, the activity monitor at step 210 can capture data associated with data entry within a text field without recording the actual data entered into the text field. For example, if the user is clicking in a known businesses internal data entry site, the activity monitor at step 210 can capture the requisite data around each of the fields of the internal website that the user is operating in. Thus, if the internal website includes other input fields such as check boxes that the user is checking, the activity monitor can capture the fact that the user is checking a check box and the label associated with that check box. In this way, the activity monitor can be configured to not only record the user's mouse click, but can also be configured to record the context in which the mouse click was performed.

Once the event associated with event ID generated at step 208 is recorded at step 210 the process can move to step 212 wherein the recorded even and event ID are transmitted to the central server. The process 200 described in FIG. 2 can be carried out at each and every computing device 102*a-d*. Thus, the central server 104 can receive user input data from each and every computing device in the enterprise in a manner that protects personal data and other sensitive data that the enterprise may not want recorded. In one or more examples, the central server 104 can receive data from each and every activity monitor running on each computing device in the network and can store the received data in a database for later access and analysis.

FIG. 3 illustrates exemplary user data capture information according to examples of the disclosure. The exemplary user activity data entry 300 illustrated in FIG. 3 can represent the information associated with a single event ID and stored the database described above that is accessible by the central server 104 for processing. As discussed above with respect to FIG. 2, the activity monitor when recording an event at step 210 can not only record the keystrokes and user inputs associated with an event, but can also store other information associated with the event that can provide context as to what the user is doing on the computing device, and which can be used to determine whether a given process can be automated (as described in further detail below.)

In one or more examples, the user activity data entry 300 can include two columns 302 and 304 which can represent the event attribute and the property value of the attribute respectively. Event attribute column 302 can provide a description of what the information held in property value column 304 pertains to. For instance, line 306 of the user activity data entry 300 can include an "Activity ID." The "Activity ID" can be based on the user activity that matched the definition file at step 204 as described above with respect to FIG. 2. In one or more examples, rather than use a numeric ID, the information at line 306 can be expressed as an "Application Name" so as to express the activity in words rather than numbers. In one or more examples, the user activity data entry 300 can include an activity time attribute 308 that as shown in the example can include the time and date of when the activity occurred.

In one or more examples, the user activity data entry can include an "action type" attribute 310 which can describe the type of action the user was engaging in (i.e., a mouse click, a keyboard entry, etc.) In one or more examples, the user activity data entry 300 can include a "click coordinates" attribute 312 which can provide the x and y coordinates of where the action took place. In the example of FIG. 3, the click coordinates attribute is defined as (505,777) which can represent the (x,y) coordinates of the location on the screen where the mouse click occurred.

In one or more examples, user activity data entry 300 can include an "application name" attribute 314 which can include the name of the application that the user was providing input to. In the example of FIG. 3 the "application name" attribute can indicate that Internet Explorer® was the application that the user was using when they clicked on the mouse. In one or more examples, user activity data entry 300 can include a "window title" attribute 316 that can describe any specific information about what the application is doing when the user inputted the data. For example, in the example of FIG. 3, the window title attribute 316 can be set to "Google-Internet Explorer" so as to indicate that the user was accessing the google search engine when they were inputting data into Internet Explorer. As can be seen, while the attributes 302 populated in user activity data entry 300 can provide detailed information about the user's interaction with the system, the exact information the user was searching for or other personal information is not included in the entry.

User activity entry 300, in one or more examples, can include an "object type" attribute 318 which can indicate the type of object to which the user was applying the input. In the example of FIG. 3 for instance, the object type attribute 318 can be set to "button" to indicate that the user was clicking on a button in the google search page. Finally, in one or more examples, the user activity entry 300 can include an "object name" attribute 320 which can provide a descriptive title of what the user was doing when they interacted with the object type indicated at attribute 316. In the example of FIG. 3, the object name attribute 320 can be set to "Google Search" to indicate that the user was initiating a search on the google search engine when they clicked the button with their mouse on the internet explorer web browser which was at the google webpage.

In one or more examples, the central server 104 can maintain a database of user activity entries from each and every computing device 102*a-d* of the computing system described with respect to FIG. 1. As described in detail below, the database of user activity entries can be used to generate an overall visualization of the process occurring on company computing resources. In one or more examples, the user activity on any individual computing device may occur at different times during the day. In one or more examples, the one or more algorithms applied to the captured user activity can identify relevant trends even though the observations may be be uneven, temporally because while employees may perform the same activity, they may not perform it at the same time between steps and they may not perform the steps of a process at the same time. For example, one employee could be working the late shift and another employee can be working the morning shift, one employee could be slow at moving through the steps of a process while another is faster. Despite these disparities in times, the systems and methods for determining processes that are automation worthy can be grouped as similar given that disparity in time.

In order to group activities, an initial step can be to visualize the user's activities so that processes can be easily visualized and clusters can be likewise easily visualized. In one or more examples, one or more algorithms can be applied to the visualization to determine clusters of activity that are highly repeated by users in the business such that those processes/activities can be identified as good candidates for process automation. The user activity data collected at the central server in the format as described above can provide insight into the many processes that the users of the computing system are engaging in, but may not itself allow for the identification of processes that are repeated so frequently as to make automation a worthwhile endeavor. Thus, one or more methods for determining process candidates for automation may be required in which the data is analyzed to determine which processes can be automated.

Figure 4:
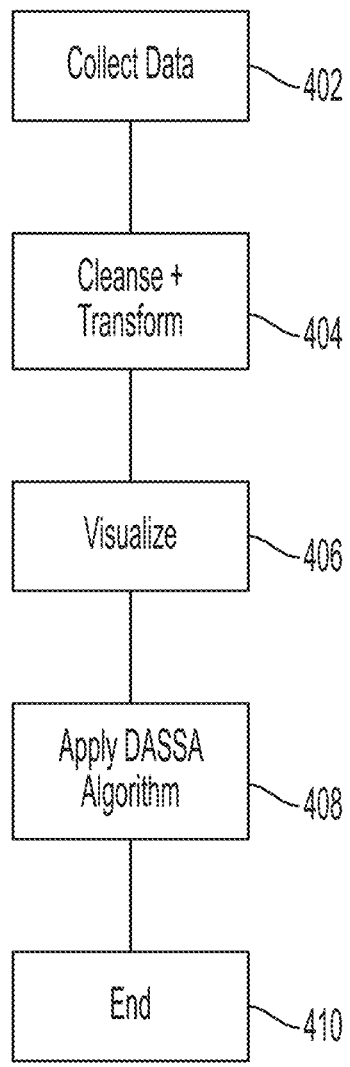
FIG. 4 illustrates an exemplary process for automating enterprise computing processes according to examples of the disclosure.

FIG. 4 illustrates an exemplary process for automating enterprise computing processes according to examples of the disclosure. The process 400 can be used to process the data received from one or more activity monitors and transform the data in a manner that can facilitate the ability to identify "clusters" of activity that could be eligible for automation. The process 400 can also use the identified clusters to generate an exemplary process that reflects the clusters of activity. In one or more example, the generated process can then be used to generate "code" that when implemented on a computing device can automatically implement the identified process.

In the example of FIG. 4, process 400 can begin at step 402 wherein the data pertaining to user activity is collected. As discussed in detail above, the data can be collected by one or more activity monitors residing or employed on a local computing device. The activity monitor on each computing device can then transmit the recorded data to pertaining a recorded activity to a central server. As also described above, the data can be stored by the central server in format described with respect to FIG. 3. The process 400, in one or more examples, can be implemented on the central server, and thus at step 402 of process 400, the central server can collect the data transmitted by each activity monitor, and can store the data in a memory or database for later access and analysis.

Once the data has been collected at step 402, the process can move to step 404 wherein the data undergoes a cleaning process and transformation. In one or more examples, data cleaning can refer to the process of detecting and correcting corrupted data or detecting and removing incomplete data and/or data that doesn't make sense (i.e., irrelevant). Including this type of data may frustrate the process of visualizing and clustering the data and thus removing and/or "cleansing" the data can facilitate an efficient transformation of the data so that it can be visualized and clusters can be identified.

As described above, at step 402, the data can also be transformed. The process of transforming the data can refer to the process of using the attributes of an event to determine one or more parameters about the data. In one or more examples, transformation of the data can include converting the attributes of each event into a particular event ID, activity type, and case ID.

In one or more examples, an "event ID" can simply refer to the time at which a particular action occurs (i.e., a timestamp). The activity monitor described above, in addition to recording the computing activity that a user engages in, can also note the time at which the activity occurred. In one or more examples, the timestamp recorded by an activity can be converted into a common format and saved in memory as an "event ID." Referring back to FIG. 3, the "activity time" field 308, in one or more examples, can be transformed at step 402 to an "event ID."

In one or more examples of the disclosure, "activity type" can refer a description of the activity the user was engaging in. For instance, entering data in a search field, mouse clicks, etc., can be examples of different activities that an activity monitor can record. In one or more examples, the data collected by an activity can be labeled by an "activity type" label as part of the transformation of the data collected by an activity monitor. Referring back to FIG. 3, the parameters that indicate the type of activity a user is performing can be transformed into a single "activity type." For instance, the action type field 310, click coordinates 312, application name 314, window title 316, object type 318, and object name 320 fields can be transformed in to a common "activity type."

In one or more examples, "Case ID" can refer to a collection of activities that are part of a singular process. For instance, in order to perform a search on a search engine, a user will have to engage in a plurality of activity types to perform the search. They may need to open a web browser, type in a web address, click a mouse in a search field, and enter text in the search field. While each of the above listed "activities" can be labeled as different "activity types" they can all be done in the furtherance of the same process and can thus all be labeled with the same "Case ID." Thus, a "Case ID" can represent a concatenation of activities performed for a singular process. As will be described in further detail below, the transformation parameters (i.e., "event ID," "activity type," and "case ID") can be used to "mine processes."

Once the user activity data has been cleansed and transformed at step 404, the process can move to step 406 wherein one or more algorithms are applied to the data so as to visualize the data. In one or more examples at step 406, a visualization tool such as DISCO™ can be applied to the data transformed at step 404 so as to generate a visual map of all of the processes that are being carried out that is expressed within the transformed data. As discussed in further detail below with respect to FIG. 5, the visualization can help an administrator of the process 400 gain a rough idea of how many clusters of automatable activity exist in the processes defined by the user activity data. In one or more examples, the visualization generated at step 406 can help the administrator gain insights into deviations from a standardized process, difficulty of automation implementation, and bottlenecks in the processes that may frustrate automation. In one or more examples, the visualization generated at step 406 may not be required to automate a process but can instead be used as a second check on the output of the process 400. In other words, an administrator can use the visualization provided at step 406 to see if it is consistent with the final result produced by the process 400 described in further detail below.

Figure 5A:
FIGS. 5A-C illustrate exemplary visuals and clusters of user computing processes according to examples of the disclosure.
Figure 5B:
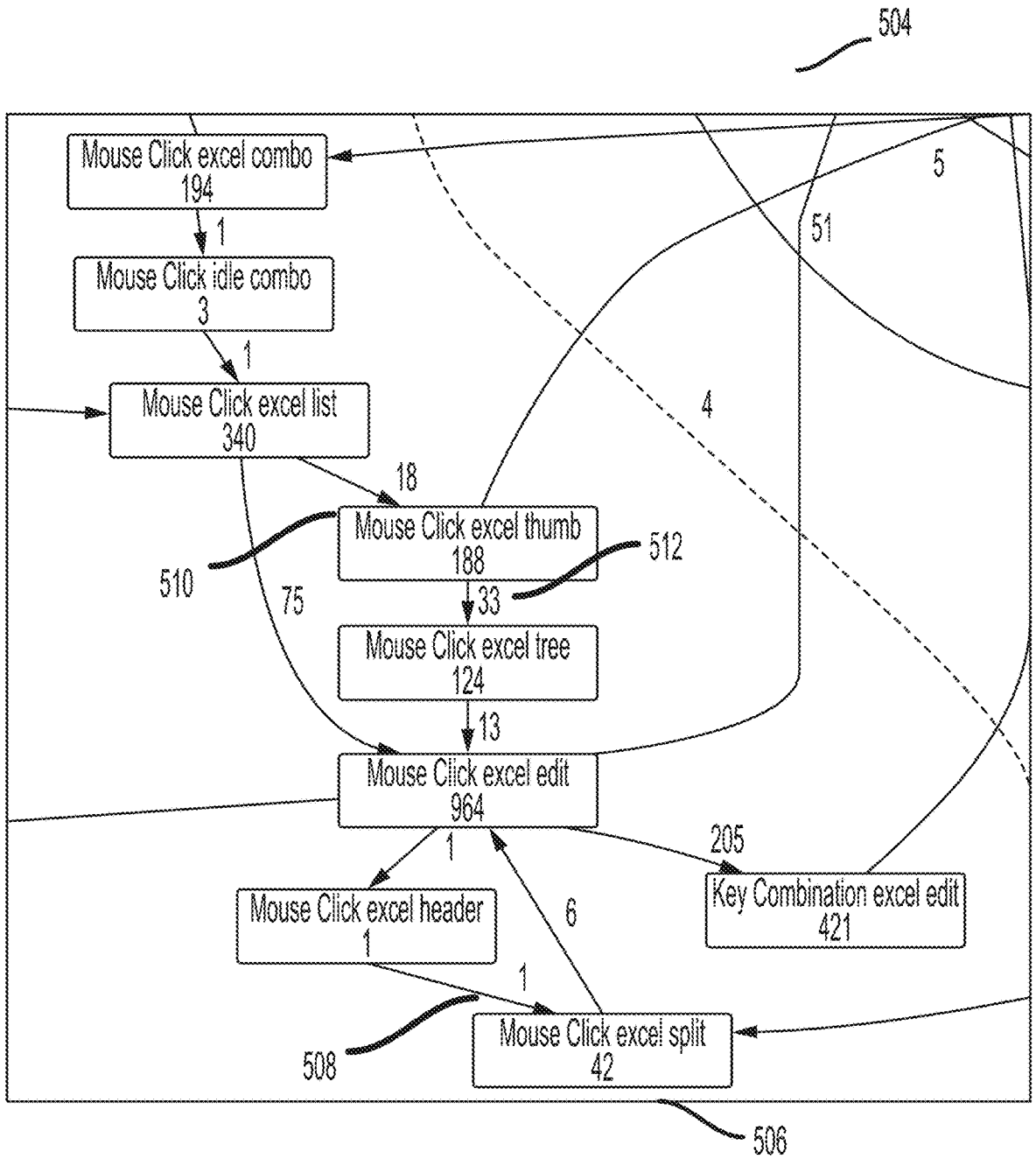
Figure 5C:
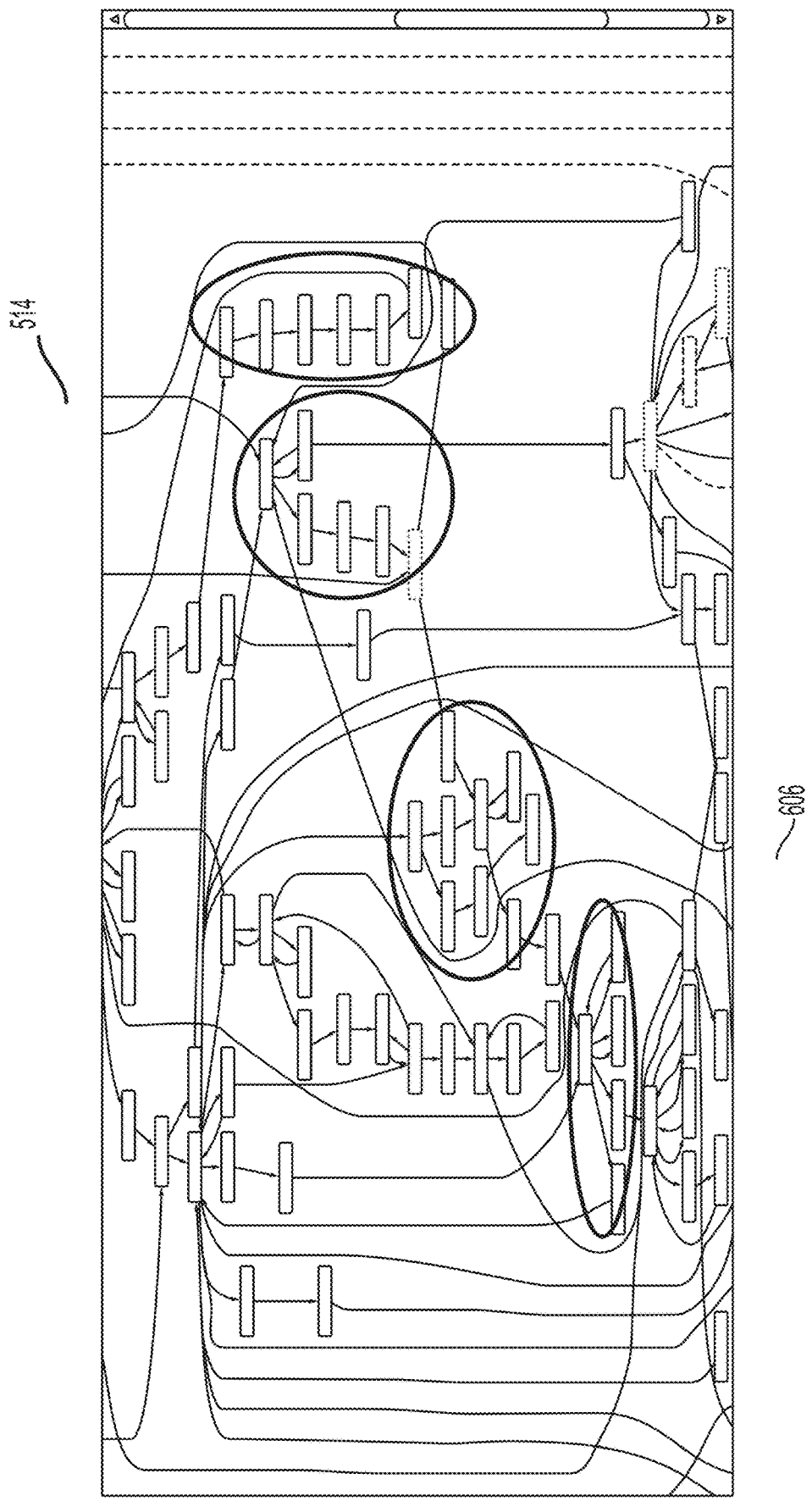

FIGS. 5A-C illustrate exemplary visuals and clusters of user computing processes according to examples of the disclosure. The examples provided in FIG. 5 are examples of the types of visuals produced at step 406 of process 400 described above. Turning to the example of FIG. 5A, visual 502 can represent a mapping of each and every activity performed in an enterprise and recorded by the activity monitors described above. As will discussed in further detail below, the elements of the visual 502 can represent not only the activities performed by users in an enterprise, but also the "flow" of how those steps are performed as well as the proximity in time that they are performed in.

FIG. 5B illustrates a zoomed in portion of the visualization 502 of FIG. The zoomed in portion 504 of FIG. 5B can better illustrate the features contained with the visualization 502 of FIG. 5A discussed above. In one or more examples, the visualization 504 can be in the form a graph that can includes a plurality of nodes 506 and a plurality of edges 508. In one or more examples, each node 506 can represent a unique combination of "activity type" and "case ID" created during the transformation step 402 of process 400 described above with respect to FIG. 4. In one or more examples, each node 506 can be placed on the visualization based on the "event ID" generated during the transformation step 402 of process 400 also described above with respect to FIG. 4.

In one or more examples, each node 506 can be connected to other nodes via edges 508. An edge 508 in the visualization 504 can represent the next action taken by a user or users after the activity represented by the node has been performed. As an example, node 510 can represent a "mouse click excel thumb" activity ID with a case ID 188. Edge 512 can show that when a user performed the action represented by node 510, the next activity they performed was to perform a "mouse click excel tree" with case ID 124. In one or more examples, each edge 508 can include a number that represents the number of users that performed an activity at the origination node and then performed the activity at the termination node. For instance edge 512 illustrates that 33 users first performed a "mouse click excel thumb" with Case ID 188 and then performed "mouse click excel tree" with Case ID 124.

As also illustrated in FIG. 5B, a plurality of the nodes 506 can be connected to other nodes via multiple edges. This can represent the fact that after performing a particular activity represented by the node 506, users then performed different activities that are represented by different nodes. Thus, the graph provided by visualizations 502 and 504 can provide a comprehensive map of user activity and the progression of activities they performed while using an enterprise's computing system.

As discussed above, the visualization 502 generated at step 406 of the process 400 may not be required to identify processes for automation, but can be used a "second check" against the results generated by process 400. In one or more examples, an administrator can use the visualization 502 to visually identify one or more "clusters" of activity. A "cluster" of activity can represent a group of nodes that have been performed in close time proximity to one another and thus could be indicative of a process that may be a candidate for automation. FIG. 5C illustrates the same visualization 502 of FIG. 5A, with potential clusters marked with a number 1-5. As shown in the visualization 514 of FIG. 5C, an administrator can visually find clusters of activity, mark them, and then use the visualization as a "second check" against the results generated by process 400.

Returning back to the example of FIG. 4, after the visualization is generated at step 406, the process can move to step 408 wherein a Data Sequence Segmentation Automatically (DASSA) model can be applied to the transformed user activity data so as to cluster activities into groups for potential automation. In one or more examples, the DASSA model can be configured to solve the problem of grouping sequences of multi-dimensional data points so as to capture relevant trends. As discussed in detail above, the data observations may be unevenly distributed temporally, and may be repeated multiple times in sequence thus creating multivariate time-series. Thus, in one or more examples, and given the issues described above, the DASSA algorithm can be used to determine clusters of activity using the multivariate time-series represented by the user activity data collected at each individual computing device within an enterprise.

The DASSA algorithm can take at its input, the information produced by the transformation 406 of process 400. In other words, each "node" from the visualizations discussed above with respect to FIGS. 5A-5C can represent a discrete input to the DASSA algorithm. In one or more examples, the DASSA algorithm at its output can add a "cluster ID" to each of the nodes, indicating a potential cluster that the node belongs to. A plurality of nodes that are assigned a common cluster ID by the DASSA algorithm can represent a potential cluster of computing processes that could potentially be automated.

In one or more examples, the DASSA algorithm can process the user data in three separate stages. In a first stage, a segment-graph (i.e., directed acyclic graph (DAG)) can be produced so as to efficiently represent the possible segmentations, and to facilitate a search among all of the possible segmentations. In one or more examples, the first stage can include inputting each node into the algorithm, and the algorithm can then create a DAG that includes all nodes, and all possible node edge combinations (i.e., every node is connected by an edge to every other node.)

In a second stage, an "Information Bottleneck and Minimum Description Length-based" clustering algorithm can be applied to the generated segment-graph so as to capture temporal similarities between data values. Finally, in a third stage of the DASSA algorithm, a "directed acyclic graph to average longest path" algorithm can be applied to automatically find the segmentation.

The output of the DASSA algorithm can present the user with a number of clusters that can contain data that are similar in content and that are similar temporally speaking. Each of the clusters identified can represent a potential candidate for automation, as it represents a set of user activity that is repeated often and in a consistent manner. Returning to the example of FIG. 4 once the DASSA algorithm has been applied to the data at step 400, process 400 can move to step 410 wherein the process is terminated.

In one or more examples, the process 400 can ultimately terminate after having generated one or more "clusters" that can represent processes that are automatable insofar as they are repeatable and consistent. From these clusters, one or more processes for automation can be chosen. Once a cluster is chosen, the next step in automating the process can be to actually produce code (i.e., a software "bot") that can then be deployed within an enterprise computing environment that can then automatically perform the process with little or no human intervention.

Figure 6:
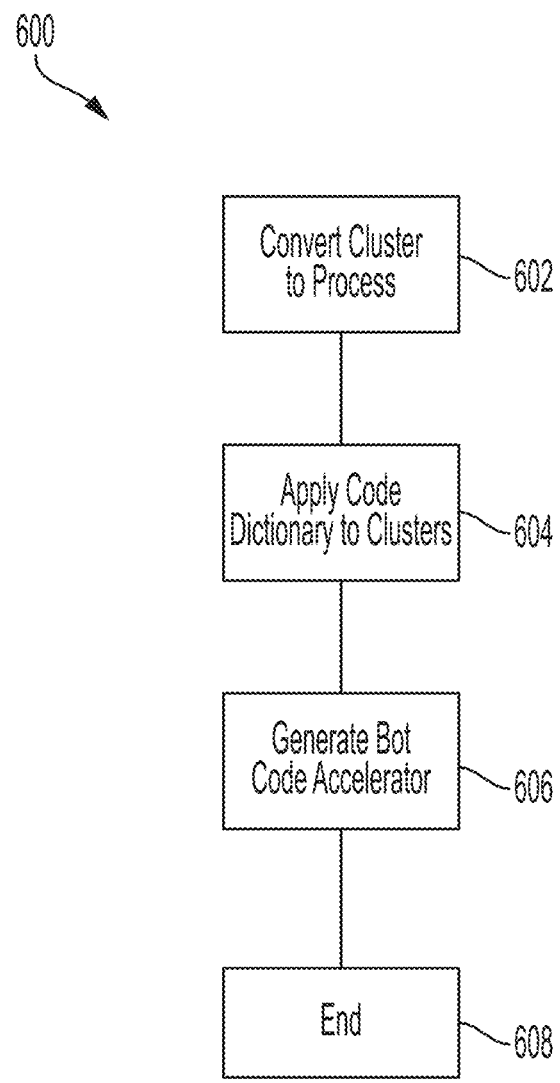
FIG. 6 illustrates an exemplary process for creating a software agent configured to automate an identified process according to examples of the disclosure.

FIG. 6 illustrates an exemplary process for creating a software agent configured to automate an identified process according to examples of the disclosure. In one or more examples, the process 600 of FIG. 6 can begin at step 602 wherein one or more of the clusters output by the process 400 of FIG. 4 can be converted into a process. In one or more examples, a cluster identified by the process 400 of FIG. 4 can be converted into a process, by converting the identified cluster into a "Business Process Modeling Notation" (BPMN) diagram. A BPMN diagram can refer to a method of illustrating business processes in a standardized format, and that is arranged so as to be readily understandable by analysts and developers who may be seeking to create software to automate the process outlines by the BPMN diagram. In one or more examples, a BPMN can be organized similar to a flow chart. The BPMN diagram can include flow objects, connecting objects, and swim lanes that collectively can illustrate a business process. Flow objects can be denoted as nodes in a BPMN diagram and can denote specific activities and events that occur during a business process. Connecting objects can connect nodes and can also be configured to indicate the flow of data between activities. In one or more examples, swim lanes can organize flow objects into specific categories that have similar functionality.

In one or more examples, once a process diagram is created at step 602, the process can then move to step 604 wherein a code dictionary can be applied to the process diagram created at step 602. A code dictionary can refer to a set of rules that convert elements in the process diagram to lines of code that when executed will emulate the process outlined by the process diagram. The code dictionary can thus be applied to the process to generate code that as described in further detail below will ultimately be used to automate a process.

In one or more examples, once the code dictionary has been applied to a process diagram at step 604, the process 600 can move to step 606 where a software bot with the generated code is created for deployment to a user computing device. In one or more examples, a software bot can refer to a software program that is configured to automate processes and tasks. A bot can represent a self-contained software program that when deployed on a computing device, can automatically begin, conduct, and terminate processes for which the bot was programmed to automated. In one or more examples, after the bot is created at step 606, the process can move to step 608 wherein the process 600 is terminated.

Figure 7:
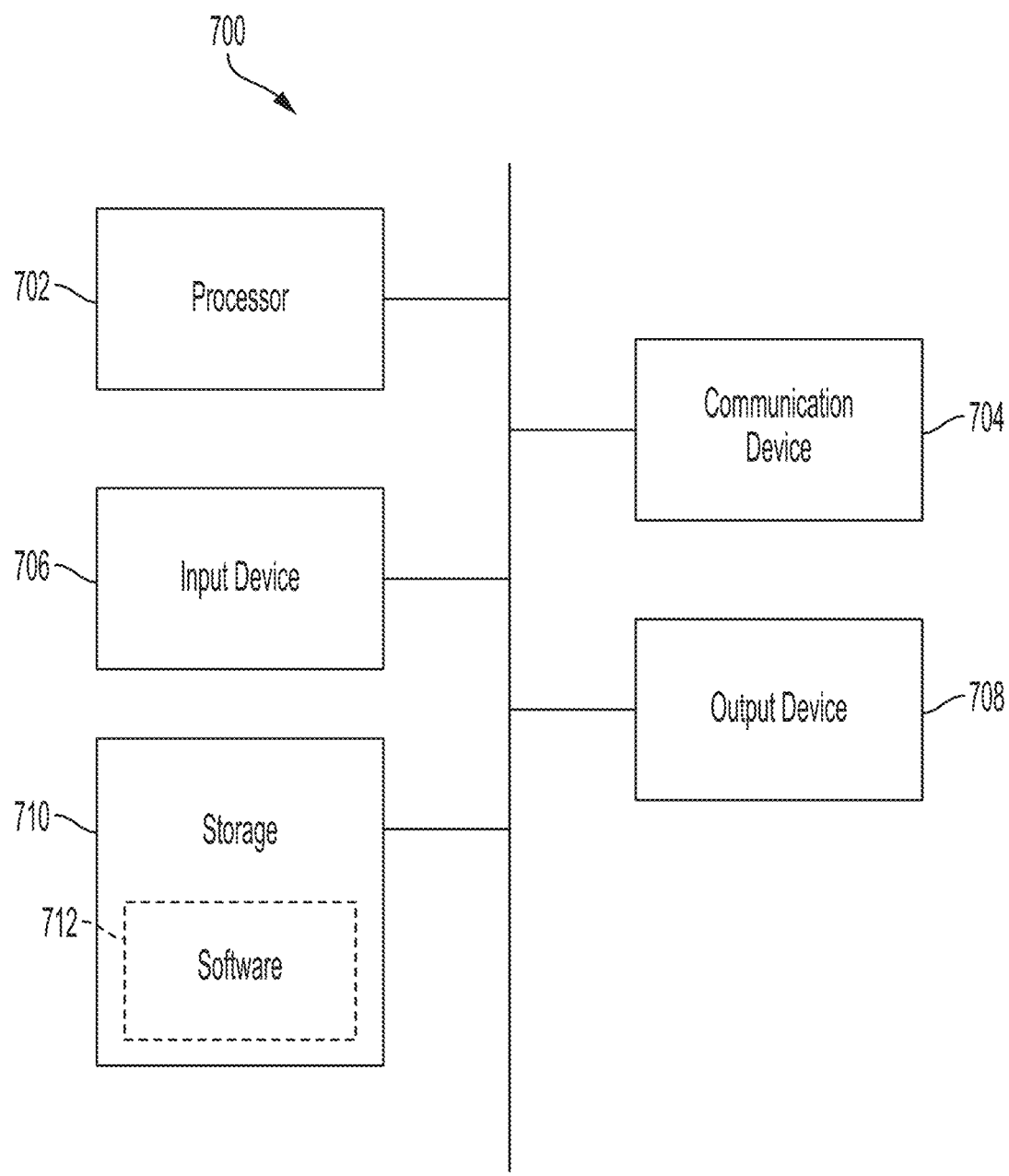
FIG. 7 illustrates an example of a computing device according to examples of the disclosure.

FIG. 7 illustrates an example of a computing device in accordance with one embodiment. Device 700 can be a host computer connected to a network. Device 700 can be a client computer or a server. As shown in FIG. 7, device 700 can be any suitable type of microprocessor-based device, such as a personal computer, workstation, server, or handheld computing device (portable electronic device), such as a phone or tablet. The device can include, for example, one or more of processors 710, input device 706, output device 708, storage 710, and communication device 704. Input device 706 and output device 708 can generally correspond to those described above and can either be connectable or integrated with the computer.

Input device 706 can be any suitable device that provides input, such as a touch screen, keyboard or keypad, mouse, or voice-recognition device. Output device 708 can be any suitable device that provides output, such as a touch screen, haptics device, or speaker.

Storage 710 can be any suitable device that provides storage, such as an electrical, magnetic, or optical memory, including a RAM, cache, hard drive, or removable storage disk. Communication device 704 can include any suitable device capable of transmitting and receiving signals over a network, such as a network interface chip or device. The components of the computer can be connected in any suitable manner, such as via a physical bus or wirelessly.

Software 712, which can be stored in storage 710 and executed by processor 702, can include, for example, the programming that embodies the functionality of the present disclosure (e.g., as embodied in the devices as described above).

Software 712 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 710, that can contain or store programming for use by or in connection with an instruction execution system, apparatus, or device.

Software 712 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 712 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

What is claimed is:

1. A method for identifying computing processes to be automated, the method comprising:
   receiving data from one or more computing devices, wherein the received data includes information about one or more activities conducted by one or more users of the one or more computing devices;
   transforming the information about the one or more activities conducted by the one or more users of the one or more computing devices into one or more attributes, wherein the one or more attributes define information about one or more processes conducted by the one or more users;
   generating a visualization of the one or more attributes, wherein the visualization is configured to provide a visualization of the one or more processes conducted by the one or more users, wherein the visualization comprises a plurality of representations of nodes and a plurality of representations of edges between nodes, wherein each representation of a node comprises a textual representation of an attribute of the one or more attributes and an activity of the one or more activities, and wherein each representation of an edge comprises a numerical representation of a number of users performing the activity;
   identifying one or more process clusters based on the one or more attributes, wherein identifying the one or more process clusters based on the one or more attributes includes applying a segmentation algorithm to the one or more attributes and generating a directed acyclic graph (DAG) using the segmentation algorithm;
   generating software code that is configured to perform a process corresponding to the identified one or more process clusters; and
   automatically performing the process using the generated software code.

2. The method of claim 1, wherein the data received from the one or more computing devices is generated by:
   recording one or more user inputs at a computing device;
   comparing the one or more user inputs to one or more inputs listed in a definition file; and
   if the one or more user inputs matches one or more of the inputs listed in the definition file:
      recording one or more parameters associated with the one or more user inputs.

3. The method of claim 2, wherein the definition file includes a list of possible inputs by the one or more users that is approved to be recorded.

4. The method of claim 1, wherein transforming the information about the one or more activities conducted by the one or more users of the one or more computing devices into one or more attributes includes generating a plurality of activity IDs and a plurality of case IDs wherein the plurality of activity IDs and case IDs is based on the information about the one or more activities received from the one or more computing devices.

5. The method of claim 4, wherein the one or more activity IDs correspond to one or more types of activity being performed on the one or more computing devices.

6. The method of claim 5, wherein a case ID of the plurality of case IDs corresponds to a common process being performed by the one or more types of activities corresponding to one or more of the activity IDs of the plurality of activity IDs.

7. The method of claim 6, wherein the visualization of the one or more attributes includes a plurality of nodes, each node of the plurality of nodes corresponding a combination of an activity ID and a case ID.

8. The method of claim 7, wherein the visualization of the one or more attributes includes a plurality of edges, wherein an edge of the plurality of edges connects a first node and a second node of the plurality of nodes in the visualization, wherein the edge originates from the first node and terminates at the second node, and wherein the edge indicates that the one or more users first performed an activity associated with the first node and then performed an activity associated with the second node.

9. The method of claim 1, wherein identifying one or more process clusters based on the one or more attributes includes performing a data sequence segmentation analysis on the one or more attributes.

10. The method of claim 9, wherein the data sequence segmentation analysis associates one or more cluster IDs to the information about one or more activities conducted by the one or more users of the one or more computing devices, wherein each cluster ID is associated with a process cluster of the one or more process clusters.

11. The method of claim 10, wherein each cluster ID of the one or more cluster IDs is associated with a subset of activities of the one or more activities conducted by the one or more users of the one or more computing devices.

12. A system for identifying computing processes to be automated, the system comprising:
   a memory;
   one or more processors; and
   one or more programs, wherein the one or more programs are stored in the memory and configured to be executed by the one or more processors, the one or more programs when executed by the one or more processors cause the processor to:
      receive data from one or more computing devices, wherein the received data includes information about one or more activities conducted by one or more users of the one or more computing devices;

transform the information about the one or more activities conducted by the one or more users of the one or more computing devices into one or more attributes, wherein the one or more attributes define information about one or more processes conducted by the one or more users;

generate a visualization of the one or more attributes, wherein the visualization is configured to provide a visualization of the one or more processes conducted by the one or more users, wherein the visualization comprises a plurality of representations of nodes and a plurality of representations of edges between nodes, wherein each representation of a node comprises a textual representation of an attribute of the one or more attributes and an activity of the one or more activities, and wherein each representation of an edge comprises a numerical representation of a number of users performing the activity;

identify one or more process clusters based on the one or more attributes, wherein identifying the one or more process clusters based on the one or more attributes includes applying a segmentation algorithm to the one or more attributes and generating a directed acyclic graph (DAG) using the segmentation algorithm;

generate software code that is configured to perform a process corresponding to the identified one or more process clusters; and automatically perform the process using the generated software code.

13. The system of claim 4, wherein the data received from the one or more computing devices is generated by:
recording one or more user inputs at a computing device;
comparing the one or more user inputs to one or more inputs listed in a definition file; and
if the one or more user inputs matches one or more of the inputs listed in the definition file:
recording one or more parameters associated with the one or more user inputs.

14. The system of claim 13, wherein the definition file includes a list of possible inputs by the one or more users that is approved to be recorded.

15. The system of claim 12, wherein transforming the information about the one or more activities conducted by the one or more users of the one or more computing devices into one or more attributes includes generating a plurality of activity IDs and a plurality of case IDs wherein the plurality of activity IDs and case IDs is based on the information about the one or more activities received from the one or more computing devices.

16. The system of claim 15, wherein the one or more activity IDs correspond to one or more types of activity being performed on the one or more computing devices.

17. The system of claim 16, wherein a case ID of the plurality of case IDs corresponds to a common process being performed by the one or more types of activities corresponding to one or more of the activity IDs of the plurality of activity IDs.

18. The system of claim 17, wherein the visualization of the one or more attributes includes a plurality of nodes, each node of the plurality of nodes corresponding a combination of an activity ID and a case ID.

19. The system of claim 18, wherein the visualization of the one or more attributes includes a plurality of edges, wherein an edge of the plurality of edges connects a first node and a second node of the plurality of nodes in the visualization, wherein the edge originates from the first node and terminates at the second node, and wherein the edge indicates that the one or more users first performed an activity associated with the first node and then performed an activity associated with the second node.

20. The system of claim 12, wherein identifying one or more process clusters based on the one or more attributes includes performing a data sequence segmentation analysis on the one or more attributes.

21. The system of claim 20, wherein the data sequence segmentation analysis associates one or more cluster IDs to the information about one or more activities conducted by the one or more users of the one or more computing devices, wherein each cluster ID is associated with a process cluster of the one or more process clusters.

22. The system of claim 21, wherein each cluster ID of the one or more cluster IDs is associated with a subset of activities of the one or more activities conducted by the one or more users of the one or more computing devices.

23. A non-transitory computer readable storage medium storing one or more programs, the one or more programs comprising instructions, which, when executed by an electronic device with a display and a user input interface, cause the device to:

receive data from one or more computing devices, wherein the received data includes information about one or more activities conducted by one or more users of the one or more computing devices;

transform the information about the one or more activities conducted by the one or more users of the one or more computing devices into one or more attributes, wherein the one or more attributes define information about one or more processes conducted by the one or more users;

generate a visualization of the one or more attributes, wherein the visualization is configured to provide a visualization of the one or more processes conducted by the one or more users, wherein the visualization comprises a plurality of representations of nodes and a plurality of representations of edges between nodes, wherein each representation of a node comprises a textual representation of an attribute of the one or more attributes and an activity of the one or more activities, and wherein each representation of an edge comprises a numerical representation of a number of users performing the activity;

identify one or more process clusters based on the one or more attributes, wherein identifying the one or more process clusters based on the one or more attributes includes applying a segmentation algorithm to the one or more attributes and generating a directed acyclic graph (DAG) using the segmentation algorithm;

generate software code that is configured to perform a process corresponding to the identified one or more process clusters; and automatically perform the process using the generated software code.

24. The non-transitory computer readable storage medium of claim 23, wherein the data received from the one or more computing devices is generated by:
recording one or more user inputs at a computing device;
comparing the one or more user inputs to one or more inputs listed in a definition file; and
if the one or more user inputs matches one or more of the inputs listed in the definition file:
recording one or more parameters associated with the one or more user inputs.

25. The non-transitory computer readable storage medium of claim 24, wherein the definition file includes a list of possible inputs by the one or more users that is approved to be recorded.

26. The non-transitory computer readable storage medium of claim 25, wherein transforming the information about the one or more activities conducted by the one or more users of the one or more computing devices into one or more attributes includes generating a plurality of activity IDs and a plurality of case IDs wherein the plurality of activity IDs and case IDs is based on the information about the one or more activities received from the one or more computing devices.

27. The non-transitory computer readable storage medium of claim 26, wherein the one or more activity IDs correspond to one or more types of activity being performed on the one or more computing devices.

28. The non-transitory computer readable storage medium of claim 16, wherein a case ID of the plurality of case IDs corresponds to a common process being performed by the one or more types of activities corresponding to one or more of the activity IDs of the plurality of activity IDs.

29. The non-transitory computer readable storage medium of claim 28, wherein the visualization of the one or more attributes includes a plurality of nodes, each node of the plurality of nodes corresponding a combination of an activity ID and a case ID.

30. The non-transitory computer readable storage medium of claim 29, wherein the visualization of the one or more attributes includes a plurality of edges, wherein an edge of the plurality of edges connects a first node and a second node of the plurality of nodes in the visualization, wherein the edge originates from the first node and terminates at the second node, and wherein the edge indicates that the one or more users first performed an activity associated with the first node and then performed an activity associated with the second node.

31. The non-transitory computer readable storage medium of claim 23, wherein identifying one or more process clusters based on the one or more attributes includes performing a data sequence segmentation analysis on the one or more attributes.

32. The non-transitory computer readable storage medium of claim 31, wherein the data sequence segmentation analysis associates one or more cluster IDs to the information about one or more activities conducted by the one or more users of the one or more computing devices, wherein each cluster ID is associated with a process cluster of the one or more process clusters.

33. The non-transitory computer readable storage medium of claim 32, wherein each cluster ID of the one or more cluster IDs is associated with a subset of activities of the one or more activities conducted by the one or more users of the one or more computing devices.

* * * * *